(12) United States Patent
Divakaran et al.

(10) Patent No.: US 12,236,330 B2
(45) Date of Patent: Feb. 25, 2025

(54) ANALYSIS AND DESIGN OF DYNAMICAL SYSTEM CONTROLLERS USING NEURAL DIFFERENTIAL EQUATIONS

(71) Applicant: SRI International, Menlo Park, CA (US)

(72) Inventors: Ajay Divakaran, Monmouth Junction, NJ (US); Anirban Roy, San Francisco, CA (US); Susmit Jha, Redwood City, CA (US)

(73) Assignee: SRI International, Menlo Park, CA (US)

( * ) Notice: Subject to any disclaimer, the term of this patent is extended or adjusted under 35 U.S.C. 154(b) by 863 days.

(21) Appl. No.: 17/331,150

(22) Filed: May 26, 2021

(65) Prior Publication Data
US 2021/0374531 A1    Dec. 2, 2021

Related U.S. Application Data

(60) Provisional application No. 63/030,023, filed on May 26, 2020.

(51) Int. Cl.
| | | |
|---|---|---|
| *G06N 3/04* | (2023.01) | |
| *G06F 18/214* | (2023.01) | |
| *G06N 3/08* | (2023.01) | |
| *G06N 3/084* | (2023.01) | |
| *G06V 10/764* | (2022.01) | |
| *G06V 10/82* | (2022.01) | |

(52) U.S. Cl.
CPC .............. *G06N 3/04* (2013.01); *G06F 18/214* (2023.01); *G06N 3/08* (2013.01); *G06N 3/084* (2013.01); *G06V 10/764* (2022.01); *G06V 10/82* (2022.01)

(58) Field of Classification Search
CPC ........ G06N 20/00; G06N 20/10; G06N 20/20; G06N 3/04; G06N 3/08; G06N 3/084; G06N 3/092; G06F 18/214; G06V 10/765; G06V 10/82
See application file for complete search history.

(56) References Cited

U.S. PATENT DOCUMENTS

2021/0089275 A1*  3/2021  Dey ....................... G06N 3/045

OTHER PUBLICATIONS

Alur et al., Theory in practice for system design and verification. ACM SIGLOG News(2) No. 1, Jan. 2015, pp. 99-104.
(Continued)

*Primary Examiner* — Shane D Woolwine
(74) *Attorney, Agent, or Firm* — Shumaker & Sieffert, P.A.

(57) ABSTRACT

In general, the disclosure describes techniques for characterizing a dynamical system and a neural ordinary differential equation (NODE)-based controller for the dynamical system. An example analysis system is configured to: obtain a set of parameters of a NODE model used to implement the NODE-based controller, the NODE model trained to control the dynamical system; determine, based on the set of parameters, a system property of a combined system comprising the dynamical system and the NODE-based controller, the system property comprising one or more of an accuracy, safety, reliability, reachability, or controllability of the combined system; and output the system property to modify one or more of the dynamical system or the NODE-based controller to meet a required specification for the combined system.

20 Claims, 3 Drawing Sheets

(56) References Cited

OTHER PUBLICATIONS

Ayed et al., "Learning Dynamical Systems from Partial Observations," arXiv.org > cs > arXiv:1902.11136, Feb. 26, 2019, 16 pp.
Chen et al., "Neural Ordinary Differential Equations," 32nd Conference on Neural Information Processing Systems(NIPS 2018), Oct. 22, 2018, 18 pp.
Cousot et al., "Abstract interpretation: a unified lattice model for static analysis of programs by construction or approximation of fixpoints," ACM, In Proceedings of the 4th ACM SIGACT-SIGPLAN symposium on Principles of programming languages (POPL '77), Jan. 1977, pp. 238-252.
Deng et al., "ImageNet: A Large-Scale Hierarchical Image Database." IEEE Computer Society Conference on Computer Vision and Pattern Recognition, Jun. 2009, 8 pp.
Deng, "The MNIST database of handwritten digit images for machine learning research," IEEE Signal Processing Magazine(29) No. 6, Nov. 2012, pp. 141-142.
Dutta et al., "Learning and verification of feedback control systems using feedforward neural networks," IFAC—PapersOnLine 51, No. 16, Jul. 11-13, 2018, pp. 151-156.
Dutta et al., "Output range analysis for deep feedforward neural networks," NFM, In NASA Formal Methods Symposium, Apr. 17, 2018, 17 pp.
Gopinath et al., "DeepSafe: A Data-driven Approach for Checking Adversarial Robustness in Neural Networks." arXiv.org > cs > arXiv:1710.00486v1, Oct. 2, 2017, 17 pp.
Grathwohl et al., "FFJORD: Free-form Continuous Dynamics for Scalable Reversible Generative Models," arXiv. org > cs > arXiv:1810.01367v3, Oct. 22, 2018, 13 pp.
Guler et al., Towards Robust and Stable Deep Learning Algorithms for Forward Backward Stochastic Differential Equations, 33rd Conference on Neural Information Processing Systems (NeurIPS 2019), Oct. 25, 2019, 10 pp.
He et al., "Deep Residual Learning for Image Recognition," arXiv.org > cs > arXiv:1512.03385v1, Dec. 10, 2015, 12 pp.
He et al., "Deep Residual Learning for Image Recognition," CVF, In Proceedings of the IEEE Conference on Computer Vision and Pattern Recognition, Jun. 26, 2016-Jul. 1, 2016 , pp. 770-778.
Honchar, "Neural ODEs: breakdown of another deep learning breakthrough," Retrieved Nov. 19, 2021 from: https://towardsdatascience.com/neural-odes-breakdown-of-another-deep-learning-breakthrough-3e78c7213795, Jun. 11, 2019, 16 pp.
Ivanov et al., "Verisig: verifying safety properties of hybrid systems with neural network controllers," arXiv.org > cs > arXiv:1811.01828v1, Nov. 5, 2018, 11 pp.
Jha, "Trust, Resilience and Interpretability of AI Models," In 12th International Workshop on Numerical Software Verification(NSV 2019), Jul. 13-14, 2019, 23 pp.
Katz et al., "Reluplex: An Efficient SMT Solver for Verifying Deep Neural Networks," arXiv.org > cs > arXiv:1702.01135v2, May 19, 2017, 31 pp.
Krizhevsky, "Convolutional deep belief networks on cifar-10." Unpublished manuscript(40), No. 7, Aug. 2010, 9 pp.
Liu et al., :Deep Learning Theory Review: An Optimal Control and Dynamical Systems Perspective, arXiv.org > cs > arXiv:1908.10920v2, Sep. 28, 2019, 16 pp.
Massaroli et al., "Dissecting Neural ODEs," 34th Conference on Neural Information Processing Systems (NeurIPS 2020), Jun. 20, 2020, 23 pp.
Reference tweet from Marc Deisenroth—Jun. 21, 2018, 1 pp.
Roy et al., "Combining Bottom-Up, Top-Down, and Smoothness Cues for Weakly Supervised Image Segmentation," CVF, In Proceedings of the IEEE Conference on Computer Vision and Pattern Recognition, Jul. 21-26, 2017, pp. 3529-3538.
Van Der Maaten et al., "Visualizing Data using t-SNE," Journal of Machine Learning Research(9), Nov. 2008, pp. 2579-2605.
Zhang et al., "Top-down Neural Attention by Excitation Backprop," arXiv.org > cs > arXiv:1608.00507v1, Aug. 1, 2016, 21 pp.
Zhong et al., "Symplectic ODE-Net: Learning Hamiltonian Dynamics with Control," arXiv.org > cs > arXiv:1909.12077v1, Sep. 26, 2019, 12 pp.

\* cited by examiner

ANALYSIS AND DESIGN OF DYNAMICAL SYSTEM CONTROLLERS USING NEURAL DIFFERENTIAL EQUATIONS

This application claims the benefit of U.S. Provisional Patent Application No. 63/030,023, filed 26 May 2020, the entire contents of which is incorporated herein by reference.

TECHNICAL FIELD

This disclosure is related to machine learning systems, and more specifically to analysis and design of dynamical system controllers using neural differential equations.

BACKGROUND

Dynamical systems can be used to model real world physical processes, such as natural phenomena, robotic environments, computing systems, reinforcement learning systems, navigation, anatomical processes, autonomous driving, industrial processes, and others. Based on measurements from the physical process, the dynamical system is generated to include a set of variables, X, the values for which represent the state, S, of the dynamical system. That is, a tuple of values for X represents a point in the state space for the dynamical system and the evolution of the dynamical system describes the future states that follow from an initial state. The dynamical system transitions among discrete states of the system over time steps, in some cases based in part on inputs from a control system that provides control data to one or more components of the dynamical system to transition, by applying a transfer function $f$ to the inputs, the dynamical system from a current state $S_t$ to a next state $S_{t+1}$.

SUMMARY

In general, the disclosure describes techniques for characterizing a dynamical system and a neural ordinary differential equation (NODE)-based controller for the dynamical system. For example, a controller may be generated to control a physical process using analytically tractable building blocks that are based on NODEs. A NODE model for a controller may be trained using measurement data and control data for a dynamical system—itself modeling a physical process. In some examples, a separate NODE model for the dynamical system may be trained using the measurement data and the control data for the dynamical system.

An analysis system obtains the parameters for the trained NODE model for the controller. Any future states can be determined using the parameterized transfer functions of the associated differential equations for the NODE model. The analysis system in this way may determine a system property of a combined system that includes both the dynamical system and the NODE-based controller. The system property may be, for instance, the accuracy, safety, reliability, reachability, or controllability of the combined system.

The techniques may provide one or more technical advantages. For example, existing techniques for modeling a dynamical system using deep neural networks, for which it is difficult to identify the transfer function for the dynamical system because such methods rely on brute force approximation. Contrariwise, training a NODE-based controller to control the dynamical system provides an analytically tractable type of neural network in which the analysis system can more easily obtain the parameters for the various incremental layers of the NODE model and process these parameters to identify a formula-based representation in a NODE formulation. The analysis system can then perform a systematic analysis using identified transfer functions to determine the system properties of the combined system. This may provide improved scalability due at least in part to parametric efficiency of NODEs versus more traditional neural networks, a more adaptive complexity, and avoid at least some of the restrictive assumptions (e.g., linear modeling) over existing approaches.

In an example, an analysis system is to characterize a dynamical system and a neural ordinary differential equation (NODE)-based controller for the dynamical system. The analysis system comprises: a memory; and one or more processors coupled to the memory, wherein the one or more processors are configured to: obtain a set of parameters of a NODE model used to implement the NODE-based controller, the NODE model trained to control the dynamical system; determine, based on the set of parameters, a system property of a combined system comprising the dynamical system and the NODE-based controller, the system property comprising one or more of an accuracy, safety, reliability, reachability, or controllability of the combined system; and output the system property to modify one or more of the dynamical system or the NODE-based controller to meet a required specification for the combined system.

In an example, a system comprises a neural ordinary differential equation (NODE)-based controller for a dynamical system, the NODE-based controller comprising processing circuitry and a NODE model trained to control the dynamical system, the NODE model comprising a set of parameters; an analysis system comprising processing circuitry and configured to: process the set of parameters of the NODE model to compute a system property of a combined system comprising the dynamical system and the NODE-based controller, the system property comprising one or more of an accuracy, safety, reliability, reachability, or controllability of the combined system; and modify one or more of the dynamical system or the NODE-based controller to meet a required specification for the dynamical system.

In an example, a method comprises obtaining, by an analysis system to characterize a dynamical system and a neural ordinary differential equation (NODE)-based controller for the dynamical system, a set of parameters of a NODE model used to implement the NODE-based controller, the NODE model trained to control the dynamical system; determining, by the analysis system and based on the set of parameters, a system property of a combined system comprising the dynamical system and the NODE-based controller, the system property comprising one or more of an accuracy, safety, reliability, reachability, or controllability of the combined system; and outputting, by the analysis system, the system property to modify one or more of the dynamical system or the NODE-based controller to meet a required specification for the combined system.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
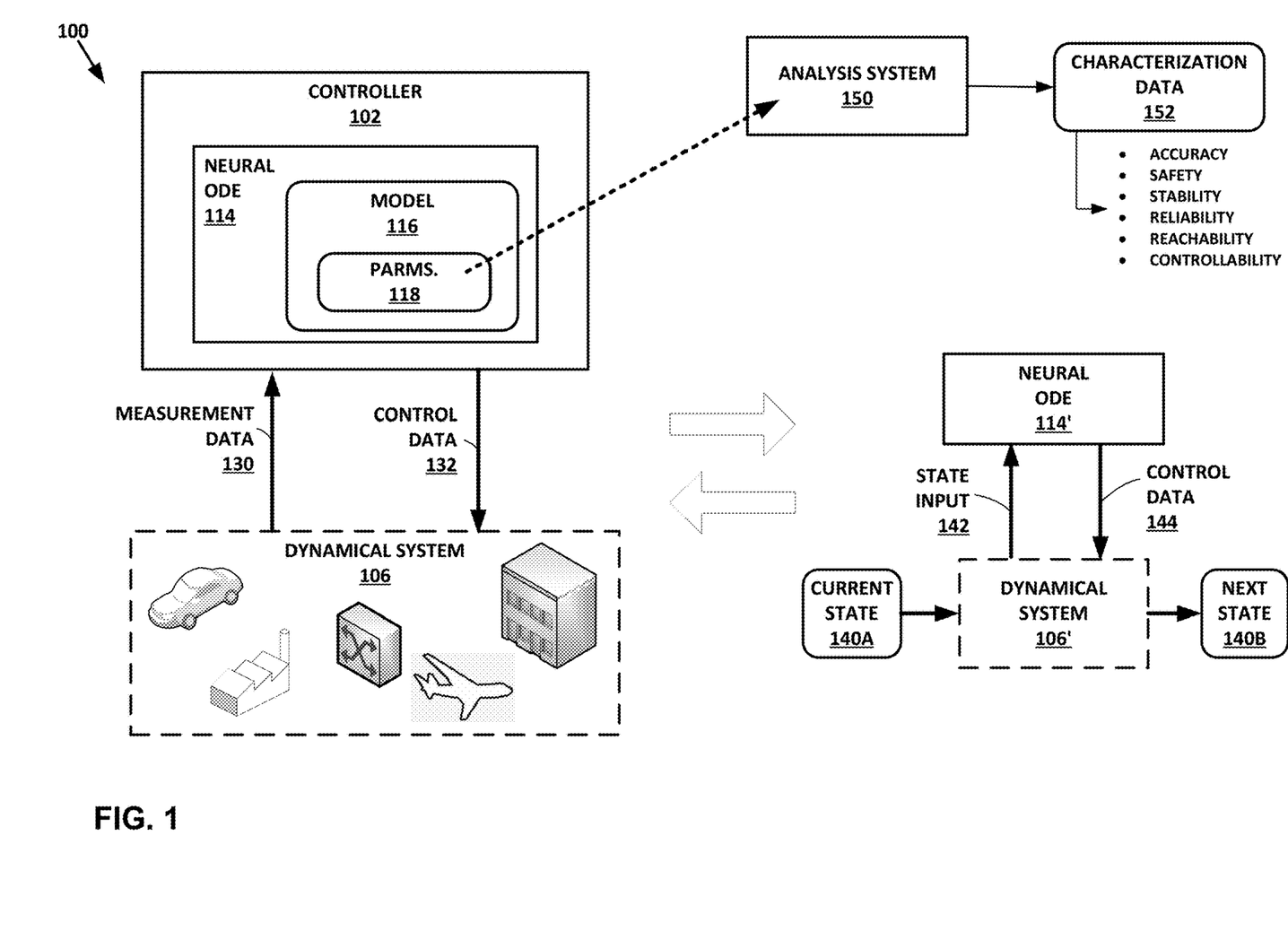
FIG. 1 is a block diagram illustrating an example combined system and analysis system that analyzes the combined system to improve a controller design, in accordance with the techniques of the disclosure.

FIG. 1 is a block diagram illustrating an example combined system 100 and analysis system 150 that analyzes combined system 100 to improve controller 102 design, in accordance with the techniques of the disclosure. Combined system 100 includes a dynamical system 106 that models a real-world physical process, such as a robot or robotic environment, computing system, flight system, reinforcement learning system, navigation system, anatomical processes, autonomous driving system, industrial process, or other physical process. Dynamical system 106 that models the physical process may thus represent an autonomous vehicle, a firewall or other intrusion and detection system, a building management system, a factory monitoring and control system, a flight control system, or other dynamical system.

One or more devices, such as sensors or control devices, generate measurement data 130 that describe the state or operation of dynamical system 106. Such measurement data may include temperature data, captured images, video, position or location data, inertial measurement data, infrared images, weather data, power usage, accelerometer and gyroscope data, electrical measurements, noise data, vibration data, packet data, strain gauge data, or other measurement data collected from devices that generate signals or other measurement data that describes the state or operation of a physical process. Such physical processes are often complex and nonlinear, which makes modeling the corresponding dynamical system challenging.

The model of dynamical system 106 may be generated using a variety of techniques. For example, measurement data 130 that measure the physical phenomena may be used to train a deep neural network (DNN), which may be an example implementation for model 116. Deep learning methods for training neural networks fit a function (typically non-linear) $f$ between input (i) and true output (o) and learn the parameters (weights) w so that the model's output (o') is close to true output (o). The learning part can be posed as an optimization problem, where l is a loss function:

$$\min_w l(o, o'), \text{ s.t. } o' = f(w, i)$$

In some examples, dynamical system 106 may be modeled using residual networks or neural ordinary differential equations. A residual block $f_t + g_t$ (or "Resnet block") forms residual connections between layers and learns only the residual feature updates $g_t$. In general, a neural ODE is a type of neural network model in which standard layer to layer propagation is generalized to continuous depth models. Rather than modeling $f$ directly, step-wise Resnet updates $f_{t+1} = f_t + g_t$ may be modeled through g as Euler updates $$f_{t+1} = f_t + \frac{df}{dt},$$

and the propagation in the residual network may be considered the one-step discretization of the forward Euler scheme on an ordinary differentiation equation $$\frac{df}{dt} = g.$$

Neural ordinary Differential Equations are described in Chen et al., "Neural Ordinary Differential Equations," $32^{nd}$ Conference on Neural Information Processing Systems, Dec. 14, 2019, and is incorporated by reference herein in its entirety.

Combined system 100 also includes a controller 102 (also referred to herein as a control system). Controller 102 receives measurement data 130 from devices of dynamical system 106 and, if appropriate, moves dynamical system 106 from a current state to a different, desired state by sending control data 132 to control devices of dynamical system 106. Control devices (not shown) of dynamical system 106 are devices that affect the corresponding physical process or system and may include, e.g., air conditioners, chillers, heating systems, autonomous vehicle components, firewalls or other intrusion and detection systems or other network devices, software, traffic lights, or other devices that can be used to alter an environment or otherwise change state or operations of a physical process or system.

Controller 102 and devices of dynamical system 106 may be connected by one or more communication links, such as computer networks, satellite links, or communication buses.

Controller 102 is "NODE-based," i.e., includes a Neural ODE ("NODE") 114 having a model 116 to model the controller for the particular dynamic system 106 of combined system 100. Model 116 is thus a NODE model. Neural ODE 114 may be an Augmented Neural ODE (ANODE).

Model 116 is a model structured according to a NODE architecture and is trained using training data that may include both measurement data and control data for dynamical system 106. For example, model 116 may be trained as a residual network having respective ODE solver modules in place of residual blocks to determine parameters of model 116, i.e., parameters 118. Parameters of a neural network are also known as "weights." An ODE solver computes solutions to ordinary differential equations. The ODE Solver may use, e.g., Runge-Kutta methods, Adams-Bashforth methods, Euler's method, multi-step methods, or Systems of ODEs with absolute converge. A neural ODE may also be referred to as an ODE-net. Backpropagation may be used to train model 116.

FIG. 1 also illustrates a conceptual diagram of combined system 100 showing a trained neural ODE 114' processing state input 142 from a model of the dynamical system 106' to compute "predicted" outputs in the form of control data 144. The dynamical system 106' processes the control data 144 to transition the system from a current state 140A to a next state 140B. The next state 140B results in new state input 142, and the control process continues.

Model 116 is thus trained using training data that includes output data (control data 144, control data 132) from the controller 102 that is control input data for dynamical system 106 as well as output data (state input 142, measurement data 130) from dynamical system 106 that is input data for controller 102.

The combined system 100 of the model 116' and dynamical system 106' can effectively be considered, in examples where dynamical system 106' is also NODE-based, as an overall NODE composition that determines a next state 140B for any current state 140A, where the state space of the model 116' and dynamical system 106' is defined by variables for both the corresponding controller 102 and the corresponding dynamical system 106.

Combined system 100 may be required, according to a specification, to operate within certain operating parameters. For example, an autonomous vehicle has numerous limits to facilitate human safety, a building management system has goals and limitations to pursue environmental, personal comfort, and building stability targets. Controllers for dynamical systems are typically manually designed to facilitate operation of dynamical systems within the specified operating parameters.

According to techniques of this disclosure, an analysis system 150 obtains and analyzes the parameters 118 of model 116 to characterize dynamical system 106 and NODE-based controller 102 for dynamical system 106. Based on the obtained parameters 118 of model 116, analysis system 150 can determine one or more system properties of the combined system 100.

For example, model 116 may include a set of transfer functions that are parameterized by parameters 118. Analysis system 150 can use the set of transfer functions and parameters 118 to, for instance, determine future states using the parameterized transfer functions of the associated differential equations for the NODE model. The characteristics function, such as the characteristic polynomial, of the system 150 is modeled by the NODE model 116. Thus, an analytical characterization of 150 can be applicable to the model 116 and its parameters 118. Analysis system 150 in this way may determine a system property of a combined system that includes both the dynamical system 106' and the NODE-based controller 102. Analysis system 150 may output an indication of the system property as characterization data 152 via, e.g., a display, a file, or a message, for instance. This system property may be used to modify the dynamical system 106, the controller 102, or both, in order to meet a required specification for the combined system 100.

The system property determined by analysis system 150 may be, for instance, the accuracy, safety, stability, reliability, reachability (the set of states that are reachable by dynamic system 106), or controllability of the combined system. As such, analysis system 150 may apply control systems theory, for instance to perform a reachability analysis, an accuracy analysis, a stability analysis, a reliability analysis, a reachability analysis, and/or a controllability analysis of the parameters 118 to determine any corresponding system properties from the analyses. As noted above, an operator or automated tool can use the system property, as computed by analysis system 150, that characterizes dynamical system 106 and controller 102, to modify the dynamical system 106, the controller 102, or both. For example, the system property may cause the operator or automated tool to further train the Neural ODE 114, change the number of layers or number of parameters of Neural ODE 114 (or otherwise modify the Neural ODE 114 architecture), or otherwise modify some aspect of the combined system 100 to attempt to configure the combined system 100 so that the combined system 100 can meet a required specification.

Figure 2:
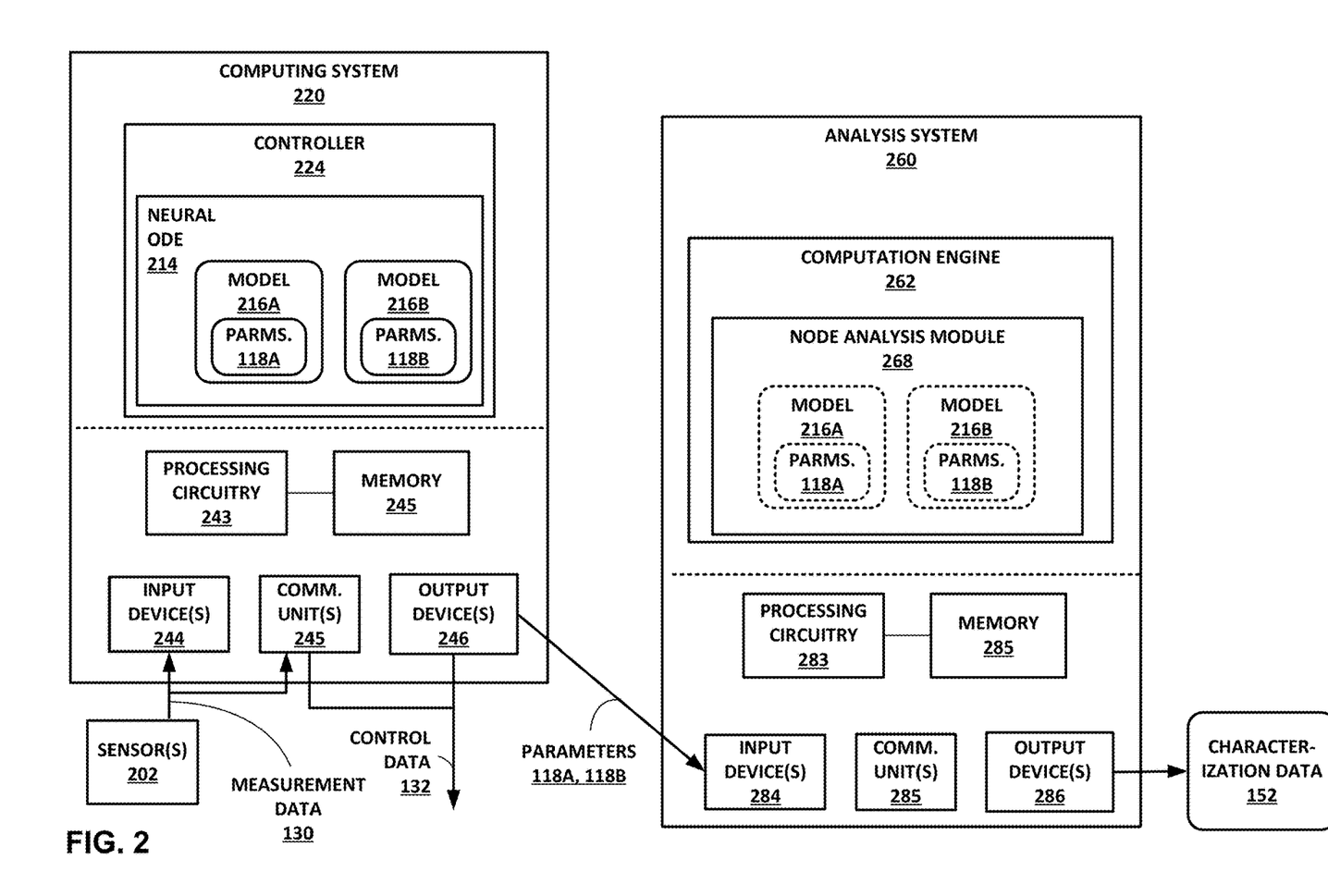
FIG. 2 is a block diagram illustrating, in further detail, example implementations of a controller for a dynamical system and an analysis system, in accordance with the techniques of the disclosure.

FIG. 2 is a block diagram illustrating, in further detail, example implementations of a controller for a dynamical system and an analysis system, in accordance with the techniques of the disclosure. Controller 224 and analysis system 260 may represent an example instance of controller 102 and analysis system 150 of FIG. 1, respectively.

Computing system 220 executes controller 224, which may be implemented as software, but may in some examples include any combination of hardware, firmware, and software. Computing system 220 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 220 may represent a cloud computing system, server farm, and/or server cluster (or portion thereof) that provides services to client devices and other devices or systems. In other examples, computing system 220 may represent or be implemented through one or more virtualized compute instances (e.g., virtual machines, containers) of a data center, cloud computing system, server farm, and/or server cluster.

Memory 245 may store information for processing during operation of computing system 220. In some examples, memory 245 may include temporary memories, meaning that a primary purpose of the one or more storage devices is not long-term storage. Memory 245 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Memory 245, in some examples, also include one or more computer-readable storage media. Memory 245 may be configured to store larger amounts of information than volatile memory. Memory 245 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 245 may store program instructions and/or data associated with Neural ODE 214 described in accordance with one or more aspects of this disclosure.

Processing circuitry 243 and memory 245 may provide an operating environment or platform for computing system 220. Processing circuitry 243 may execute instructions and memory 245 may store instructions and/or data of Neural ODE 214. The combination of processing circuitry 243 and memory 245 may retrieve, store, and/or execute the instructions and/or data of one or more applications, modules, or software. Processing circuitry 243 and memory 245 may also be operably coupled to one or more other software and/or hardware components, including, but not limited to, one or more of the components illustrated in FIG. 2.

Computing system 220 may perform operations described using software, hardware, firmware, or a mixture of hardware, software, and firmware residing in and/or executing at computing system 220. Computing system 220 may execute Neural ODE 214 with multiple processors or multiple devices. Computing system 220 may execute Neural ODE 214 as one or more virtual machines and/or container executing on underlying hardware. Neural ODE 214 may execute as one or more services of an operating system or computing platform. Neural ODE 214 may execute as one or more executable programs at an application layer of a computing platform.

One or more input devices 244 of computing system 220 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 246 of computing system 220 may generate, transmit, or process output. Examples of output are tactile, audio, visual, and/or video output. Output devices 246 may include a display, sound card, video graphics adapter card, speaker, presence-sensitive screen, one or more USB interfaces, video and/or audio output interfaces, or any other type of device capable of generating tactile, audio, video, or other output. Output devices 246 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 320 may include a presence-sensitive display that may serve as a user interface device that operates both as one or more input devices 244 and one or more output devices 246.

One or more communication units 245 of computing system 220 may communicate with devices external to computing system 220 (or among separate computing devices of computing system 220) by transmitting and/or receiving data, and may operate, in some respects, as both an input device and an output device. In some examples, communication units 245 may communicate with other devices over a network. In other examples, communication units 245 may send and/or receive radio signals on a radio network such as a cellular radio network. Examples of communication units 245 include a network interface card (e.g., an Ethernet card), an optical transceiver, a radio frequency transceiver, a GPS receiver, or any other type of device that can send and/or receive information. Other examples of communication units 245 may include Bluetooth®, GPS, 3G, 4G, and Wi-Fi® radios found in mobile devices as well as Universal Serial Bus (USB) controllers and the like.

Input devices 244 and/or communication units 245 may receive measurement data generated by sensors 202 or other devices that measure a state or operation of the dynamical system.

Computing system 220 executes controller 224. Controller 224 includes a neural ODE 214 that may be an example instance of neural ODE 114 of FIG. 1. Neural ODE 214 in this example includes two Neural ODE models: model 216A for controller 224 and model 216B for a dynamical system (not shown in FIG. 2). Each of the models 216A-216B include respective sets of parameters 118A-118B. Model 216A may represent an example instance of model 116 of FIG. 1.

Analysis system 260 includes computation engine 262, which may be implemented as software, but may in some examples include any combination of hardware, firmware, and software. Analysis system 260 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, analysis system 260 may represent a cloud computing system, server farm, and/or server cluster (or portion thereof) that provides services to client devices and other devices or systems. In other examples, analysis system 260 may represent or be implemented through one or more virtualized compute instances (e.g., virtual machines, containers) of a data center, cloud computing system, server farm, and/or server cluster.

Memory 285 may store information for processing during operation of computation engine 322. Memory 285 may represent any of the aforementioned types of memory described with respect to memory 285. Memory 285 may store program instructions and/or data associated with node analysis module 268 described in accordance with one or more aspects of this disclosure.

Processing circuitry 283 and memory 285 may provide an operating environment or platform for computing system 220. Processing circuitry 283 may execute instructions and memory 285 may store instructions and/or data of one or more modules. The combination of processing circuitry 283 and memory 285 may retrieve, store, and/or execute the instructions and/or data of one or more applications, modules, or software. Processing circuitry 283 and memory 285 may also be operably coupled to one or more other software and/or hardware components, including, but not limited to, one or more of the components illustrated in FIG. 2.

Analysis system 260 may perform operations described using software, hardware, firmware, or a mixture of hardware, software, and firmware residing in and/or executed by computation engine 262. Computation engine 262 may execute module 268 with multiple processors or multiple devices. Computing system 220 may execute module 268 as one or more virtual machines and/or containers executing on underlying hardware. Module 268 may execute as one or more services of an operating system or computing platform. Module 268 may execute as one or more executable programs at an application layer of a computing platform.

One or more input devices 284 of analysis system 260 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 286 of analysis system 260 may generate, transmit, or process output. Examples of output are tactile, audio, visual, and/or video output. Output devices 286 may include a display, sound card, video graphics adapter card, speaker, presence-sensitive screen, one or more USB interfaces, video and/or audio output interfaces, or any other type of device capable of generating tactile, audio, video, or other output. Output devices 286 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 320 may include a presence-sensitive display that may serve as a user interface device that operates both as one or more input devices 284 and one or more output devices 286.

One or more communication units 285 of analysis system 260 may communicate with devices external to analysis system 260 (or among separate computing devices of analysis system 260) by transmitting and/or receiving data, and may operate, in some respects, as both an input device and an output device. In some examples, communication units 285 may communicate with other devices over a network. In other examples, communication units 285 may send and/or receive radio signals on a radio network such as a cellular radio network. Examples of communication units 285 include a network interface card (e.g., an Ethernet card), an optical transceiver, a radio frequency transceiver, a GPS receiver, or any other type of device that can send and/or receive information. Other examples of communication units 285 may include Bluetooth®, GPS, 3G, 4G, and Wi-Fi® radios found in mobile devices as well as Universal Serial Bus (USB) controllers and the like.

Output devices 246 and/or communication units 245 of computing system 220 output parameters 118A, 118B for respective NODE models 216A, 216B. Input devices 284 and/or communication units 285 of analysis system 260 may receive parameters 118A, 118B from computing system 220 and store the parameters 118A, 118B to memory 285. Memory 285 also stores representations of models 216A, 216B. These components may operate similarly to communicate models 216A, 216B to analysis system 260.

In some examples, a neural network model for a non-NODE-based neural network is trained to model the dynamical system. Analysis system 260 may obtain the trained neural network model (including parameters) from the controller 224 or from another computing system. Node analysis module 268 may then apply an ordinary differential equation (ODE) solver to the neural network model to compute a NODE-based model 216A that represents the dynamical system.

Node analysis module 268 may process parameters 118A, 118B to characterize a dynamical system and NODE-based controller 224 for the dynamical system. More specifically, based on the obtained parameters 118A, 118B, node analysis module 268 can determine one or more system properties of the combined system that include the NODE-based controller 224 and the dynamical system. Output devices 246 and/or communication units 245 output characterization data 152 that include the one or more system properties.

In some examples, analysis system 260 can modify, based on the determined system properties, one or more of NODE-based controller 224 or the dynamical system to meet a required specification for the dynamical system. For instance, analysis system 260 may direct controller 224 to further train model 216A using additional training data, may reconfigure model 216A with more or fewer layers or parameters, or otherwise cause a reconfiguration of controller 224 or of the dynamical system.

Such modification may also modify the system properties, and analysis system 260 may thus iteratively attempt to move the combined system to meet the required specification by again obtaining the new parameters 118A, 118B (if any), with node analysis module 268 recomputing the system properties.

Figure 3:
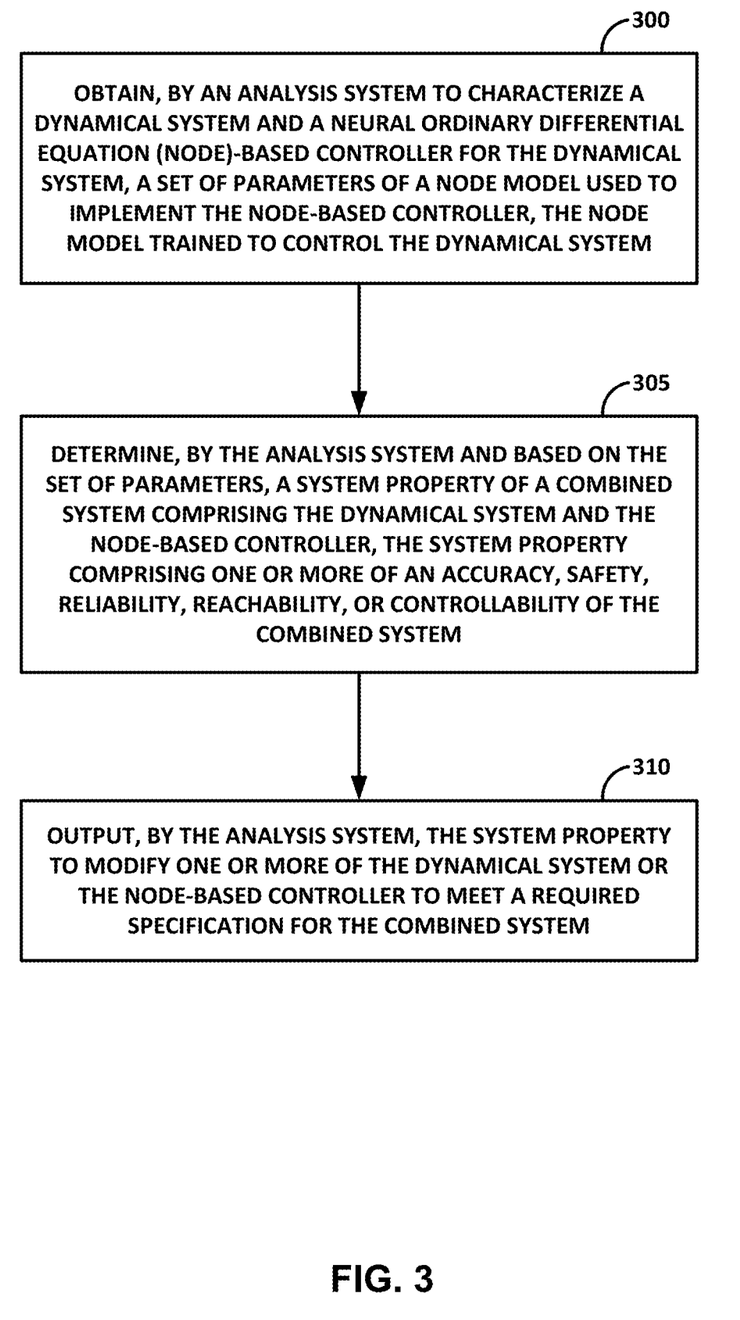
FIG. 3 is a flow diagram illustrating an example mode of operation for an analysis system to characterize a dynamical system and a neural ordinary differential equation (NODE)-based controller for the dynamical system, in accordance with techniques of this disclosure.

FIG. 3 is a flow diagram illustrating an example mode of operation for an analysis system to characterize a dynamical system and a neural ordinary differential equation (NODE)-based controller for the dynamical system, in accordance with techniques of this disclosure.

As seen in the example of FIG. 3, analysis system 150 may obtain a set of parameters 118 of a NODE model 116 used to implement NODE-based controller 102, the NODE model 116 trained to control dynamical system 106 (300). Next, analysis system 150 may determine, based on the set of parameters 118, a system property of combined system 100 comprising dynamical system 106 and NODE-based controller 102, the system property comprising one or more of an accuracy, safety, reliability, reachability, or controllability of the combined system (305). Analysis system 150 may compute (e.g., estimate) parameters 118 for the NODE model 116 by adjoint sensitivity, a backpropagation approach, or a combination of adjoint sensitivity and a backpropagation approach. Analysis system 150 may use satisfiability modulo theory (SMT)-based solvers to analyze the properties of dynamical system 106. This may include analyzing parameters 118 of the NODE model 116. Next, analysis system 150 may output the system property to modify one or more of dynamical system 106 or NODE-based controller 102 to meet a required specification for combined system 100 (310).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. An analysis system to characterize a dynamical system and a neural ordinary differential equation (NODE)-based controller for the dynamical system, the analysis system comprising:
a memory; and
one or more processors coupled to the memory, wherein the one or more processors are configured to:
obtain a set of parameters of a NODE model used to implement the NODE-based controller, the NODE model trained to control the dynamical system;
determine, based on the set of parameters, a system property of a combined system comprising the dynamical system and the NODE-based controller, the system property comprising one or more of an accuracy, safety, reliability, reachability, or controllability of the combined system; and
output the system property to modify one or more of the dynamical system or the NODE-based controller to meet a required specification for the combined system.

2. The analysis system of claim 1,
wherein the NODE model comprises a first NODE model that represents the dynamical system and a second NODE model that represents the NODE-based controller, and
wherein the one or more processors are configured to:
obtain a neural network model trained to model the dynamical system; and
apply an ordinary differential equation (ODE) solver to the neural network model to compute the first NODE model that represents the dynamical system.

3. The analysis system of claim 2, wherein the set of parameters comprises parameters for the first NODE model.

4. The analysis system of claim 1, wherein the NODE model comprises a neural network model.

5. The analysis system of claim 1, wherein the NODE model is trained using training data comprising:
output data from the NODE-based controller that is control input data for the dynamical system; and
output data from the dynamical system that is input data for the NODE-based controller.

6. The analysis system of claim 5, wherein the output data from the dynamical system comprises state data that indicates a new state for the dynamical system.

7. The analysis system of claim 1,
wherein the system property comprises reachability of the combined system, and
wherein the reachability of the combined system indicates a set of states that are reachable by the dynamical system.

8. The analysis system of claim 1, wherein the NODE model to implement the NODE-based controller comprises:
a first NODE model that represents the dynamical system;
a second NODE model that represents the NODE-based controller.

9. The analysis system of claim 1, wherein the NODE model comprises a set of transfer functions that are parameterized by the set of parameters.

10. A system comprising:
a neural ordinary differential equation (NODE)-based controller for a dynamical system, the NODE-based controller comprising processing circuitry and a NODE model trained to control the dynamical system, the NODE model comprising a set of parameters; and
an analysis system comprising processing circuitry and configured to:
process the set of parameters of the NODE model to compute a system property of a combined system comprising the dynamical system and the NODE-based controller, the system property comprising one or more of an accuracy, safety, reliability, reachability, or controllability of the combined system; and
modify one or more of the dynamical system or the NODE-based controller to meet a required specification for the dynamical system.

11. The system of claim 10,
wherein the NODE model comprises a first NODE model that represents the dynamical system and a second NODE model that represents the NODE-based controller, and
wherein the NODE-based controller is configured to:
train a neural network model to model the dynamical system; and
apply an ordinary differential equation (ODE) solver to the neural network model to compute the first NODE model that represents the dynamical system.

12. The system of claim 11, wherein the set of parameters comprises parameters for the first NODE model.

13. The system of claim 10, wherein the NODE model comprises a set of transfer functions that are parameterized by the set of parameters.

14. A method comprising:
obtaining, by an analysis system to characterize a dynamical system and a neural ordinary differential equation (NODE)-based controller for the dynamical system, a set of parameters of a NODE model used to implement the NODE-based controller, the NODE model trained to control the dynamical system;
determining, by the analysis system and based on the set of parameters, a system property of a combined system comprising the dynamical system and the NODE-based controller, the system property comprising one or more of an accuracy, safety, reliability, reachability, or controllability of the combined system; and
outputting, by the analysis system, the system property to modify one or more of the dynamical system or the NODE-based controller to meet a required specification for the combined system.

15. The method of claim 14, wherein the NODE model to implement the NODE-based controller comprises a first NODE model that represents the dynamical system and a second NODE model that represents the NODE-based controller, the method further comprising:
obtaining, by the analysis system, a neural network model trained to model the dynamical system; and
applying, by the analysis system, an ordinary differential equation (ODE) solver to the neural network model to compute the first NODE model that represents the dynamical system.

16. The method of claim 15, wherein the set of parameters comprises parameters for the first NODE model.

17. The method of claim 14, wherein the NODE model is trained using training data comprising:
output data from the NODE-based controller that is control input data for the dynamical system; and
output data from the dynamical system that is input data for the NODE-based controller.

18. The method of claim 14,
wherein the system property comprises reachability of the combined system, and
wherein the reachability of the combined system indicates a set of states that are reachable by the dynamical system.

19. The method of claim 14, wherein the NODE model to implement the NODE-based controller comprises:
  a first NODE model that represents the dynamical system; and
  a second NODE model that represents the NODE-based controller.

20. The method of claim 14, wherein the NODE model comprises a set of transfer functions that are parameterized by the set of parameters.

\* \* \* \* \*